Sept. 11, 1934.  W. M. BROCK  1,973,427
TOWER FOOTING
Filed June 25, 1932
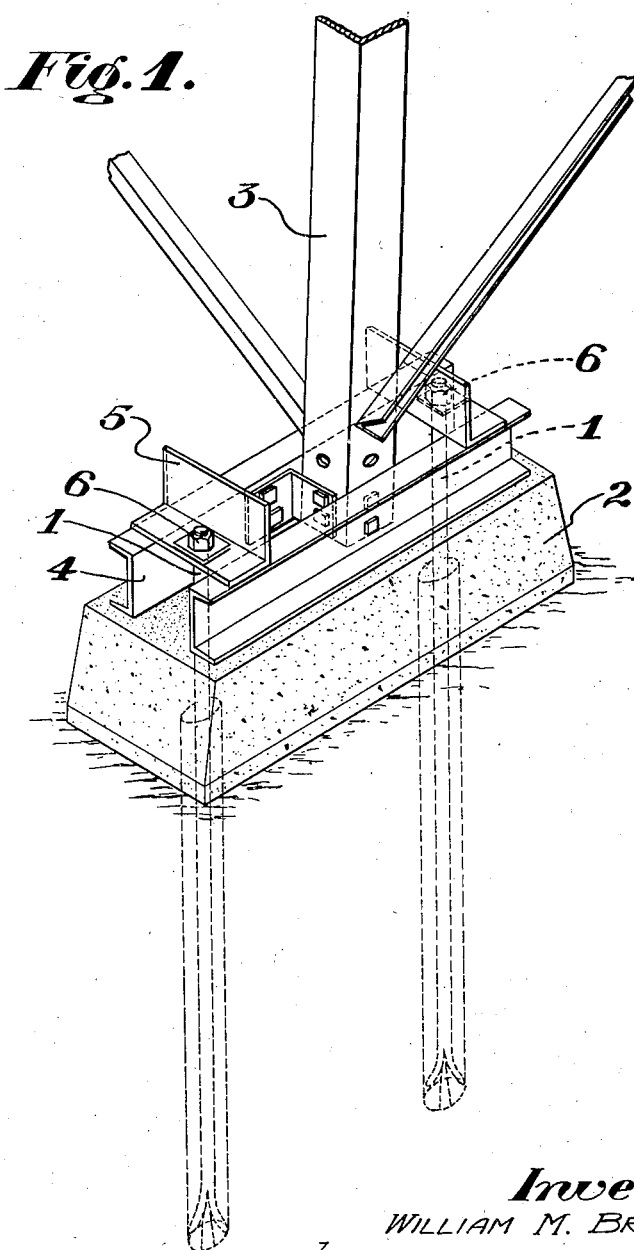
Inventor:
WILLIAM M. BROCK,
by: Usina & Rauber
his Attorneys Patented Sept. 11, 1934

1,973,427

UNITED STATES PATENT OFFICE 1,973,427

TOWER FOOTING

William M. Brock, East Windsor, Ontario, Canada

Application June 25, 1932, Serial No. 619,332

2 Claims. (Cl. 189—21)

This invention relates to steel tower footings having holes which receive anchorage bolts fixed into the ground. This construction is generally used when the ground is rocky, the bolts being fixedly installed therein and, because they are sometimes carelessly placed, not always coinciding with the holes in the tower's footings.

One of the primary objects of the present inventor is to provide a tower footing allowing a certain latitude in the positioning of its anchorage bolts. Other objects will be made apparent by the following disclosure.

A fixed location of anchor bolts may result in one or more of the bolts being positioned at a spot in the rock where cracks, seams or other defects occur, thus making secure anchorage or accurate drilling, or both, difficult. The latitude in locating the anchor bolts allowed by this type of footing results in overcoming these difficulties.

The new footing includes spaced parallel bars which are fixed to the tower's leg and are long enough to encompass a reasonable range of anchorage bolt displacement. Apertured shorter bars are laid across these bars to receive the anchorage bolts which are then provided with nuts. When these nuts are screwed down the short bars will draw the parallelly spaced bars firmly down. The short bars can function in any position along the spaced ones and can therefore accommodate differently spaced anchorage bolts.

The accompanying drawing illustrates a specific form of the invention as it appears in use.

The two anchorage bolts 1 shown in this drawing are fixed into the ground with their uppermost ends surrounded by concrete 2. If this installation has not been carefully done these bolts are bound, in a number of such installations, to be differently spaced. Only two bolts are shown in the drawing, it being understood that such a pair is necessary for each of a tower's four legs.

The tower itself is not shown either because any one of its legs 3 is sufficient to illustrate the invention. A pair of parallelly spaced channel bars 4 is fixed to the bottom of this leg, being long enough to extend beyond the bolts even when misplaced. A short apertured angle bar 5 is placed across the spaced bars 4 on either side of the leg 3 for the purpose of receiving the bolts 1. By screwing nuts 6 on these bolts the bars 4 and connected tower leg 3 will be firmly drawn down.

This specific form of the footing is shown and described in accordance with the patent statutes and not to limit the scope of the invention thereto, except as defined by the following claims.

I claim:

1. A tower footing for attachment to spaced bolts fixed to the ground comprising a pair of parallelly spaced channel bars fixed to a tower's leg and having a length greater than the space between said bolts, and an apertured angle bar placed across said bars on either side of said leg and receiving said bolts for drawing the whole firmly down upon the application of nuts to the latter.

2. A tower footing for attachment to spaced bolts fixed to the ground, including two parallelly spaced bars fixed to a tower's leg and having lengths greater than the space between said bolts, and an apertured bar placed across said bars on either side of said leg and receiving said bolts for drawing the whole firmly down upon the application of nuts to the latter.

WILLIAM M. BROCK.